United States Patent
Kuroda

(10) Patent No.: US 6,725,070 B2
(45) Date of Patent: Apr. 20, 2004

(54) PORTABLE RADIO DEVICE

(75) Inventor: Mitsuru Kuroda, Tokyo (JP)

(73) Assignee: NEC Corporation, Tokyo (JP)

( * ) Notice: Subject to any disclaimer, the term of this patent is extended or adjusted under 35 U.S.C. 154(b) by 426 days.

(21) Appl. No.: 09/921,519

(22) Filed: Aug. 2, 2001

(65) Prior Publication Data

US 2002/0019252 A1 Feb. 14, 2002

(30) Foreign Application Priority Data

Aug. 2, 2000 (JP) ........................................ 2000-233838

(51) Int. Cl.[7] .................................................. H04Q 7/32
(52) U.S. Cl. ................... 455/575.1; 455/575.7; 455/517; 343/702
(58) Field of Search ..................... 455/575.7, 575.1, 455/575.5, 550.1, 556.1, 556.2, 90.1, 90.2, 90.3, 347, 517, 422.1, 403, 552.1, 128; 343/702, 745, 749, 872, 878; 379/433.01, 428.01; D14/138, 155

(56) References Cited

U.S. PATENT DOCUMENTS

| | | | | |
|---|---|---|---|---|
| 5,337,061 A | * | 8/1994 | Pye et al. | ................. 455/575.7 |
| 5,451,965 A | * | 9/1995 | Matsumoto | ................. 343/702 |
| 6,442,400 B1 | * | 8/2002 | Ying et al. | ................ 455/552.1 |

FOREIGN PATENT DOCUMENTS

| | | |
|---|---|---|
| JP | 9-135108 | 5/1997 |
| JP | 10-51347 | 2/1998 |
| JP | 11-31991 | 2/1998 |

* cited by examiner

*Primary Examiner*—William Trost
*Assistant Examiner*—Keith Ferguson
(74) *Attorney, Agent, or Firm*—Scully, Scott, Murphy & Presser

(57) ABSTRACT

A portable radio device which effectively prevents the property of transmission of radio waves from being degraded due to the user's body, is disclosed. A housing of the portable radio device has a lower end portion shaped to protrude from the major surface of the housing and taper down towards the lower end of the housing. An antenna is provided within the lower end portion.

4 Claims, 5 Drawing Sheets

PORTABLE RADIO DEVICE

BACKGROUND OF THE INVENTION

1. Field of the Invention

The present invention relates to a portable radio device, and in particular to a portable radio device having an antenna incorporated in a housing thereof.

2. Description of the Related Art

In these days, a rapidly increasing number of people have used portable radio devices such as portable telephones. Since a radio wave has the property of being absorbed by a human body, the human body reduces the level of a transmitting radio wave when the user is using the portable telephone. Therefore, conventionally as shown in FIG. 8, an antenna 23 is usually provided on the upper end portion of a portable telephone 21 so as to prevent a user 22 from holding the antenna 23.

Another portable telephone is disclosed in Japanese Patent Application Unexamined Publication No. 9-135108. On this portable telephone, a chip antenna is disposed at the lower portion of main body of portable telephone in order to prevent transmitting radio waves from being influenced by a user.

However, when the user is using the conventional portable telephone 21 as shown in FIG. 8, the disposed position of the antenna 23 is located too close to the human body of the user, in particular to the user's head. Accordingly in this situation, the level of transmitting radio wave is inevitably reduced by influence of the human body of the user.

Further, sine the portable telephone disclosed in the above Japanese Patent Application Unexamined Publication No. 9-135108 is only provided with an antenna at the lower portion of main body of portable telephone, the antenna portion is easily covered with a hand of user and therefore it is difficult to maintain the property of wireless communication in supposing the cases where users hold the main body of portable telephone in various ways. Referring to FIG. 9, a hand of user 20 covers most of lower end of portable telephone 19 only disposing an antenna at the lower portion thereof. This causes a substantial degradation in the property of radio communication.

SUMMARY OF THE INVENTION

An object of the present invention is to provide a portable radio device which effectively prevents the property of transmission of radio waves from being degraded due to the user's body, especially the user's head and/or the user's hand holding the portable radio device.

According to the present invention, a portable radio device allowing radio communication through an antenna, includes a housing having a lower end portion shaped to locally protrude and then taper down towards a lower end of the housing, wherein the antenna is provided within the lower end portion.

The housing preferably has a major surface, wherein the lower end portion protrudes from the major surface and tapers down towards the lower end of the housing.

As an embodiment of the present invention, a speaker and a microphone used for telephone conversation may be provided on the major surface, wherein the microphone is provided on the major surface at a position higher than the lower end portion.

Preferably, a center portion of the lower end portion corresponding to the microphone is cut away to form a plane portion. The plane portion may be flush with the major surface provided with the microphone.

According to another embodiment of the present invention, a portable radio device includes: an upper housing having a major surface of the portable radio device and a first lower end portion shaped to protrude from the major surface and taper down towards a lower end of the portable radio device; and a lower housing having a back surface of the portable radio device and a second lower end portion shaped to taper down towards the lower end of the portable radio device, wherein the antenna is provided within the first and second lower end portions.

According to another aspect of the present invention, a portable radio device allowing radio communication through an antenna, includes: a housing having a main portion and a lower end portion, wherein a width of the lower end portion is wider than that of the main portion, wherein the antenna is provided within the lower end portion.

The housing may include: an upper housing having a first lower end portion, wherein a width of the first lower end portion is wider than that of the main portion; and a lower housing having a second lower end portion, wherein a width of the second lower end portion is wider than that of the main portion, wherein the antenna is provided within the first and second lower end portions.

Preferably, a plane figure of the lower end portion is shaped like one of approximately circle and ellipse.

As described above, since the lower end portion of the housing having an antenna therein is shaped to locally protrude and then taper down or widen towards the lower end thereof, a user inconveniently holds this lower end portion. In other words, when a user holds the portable radio device, there is a high possibility that the lower end portion is prevented from being covered with a hand of a user.

DESCRIPTION OF THE PREFERRED EMBODIMENTS

Figure 1:
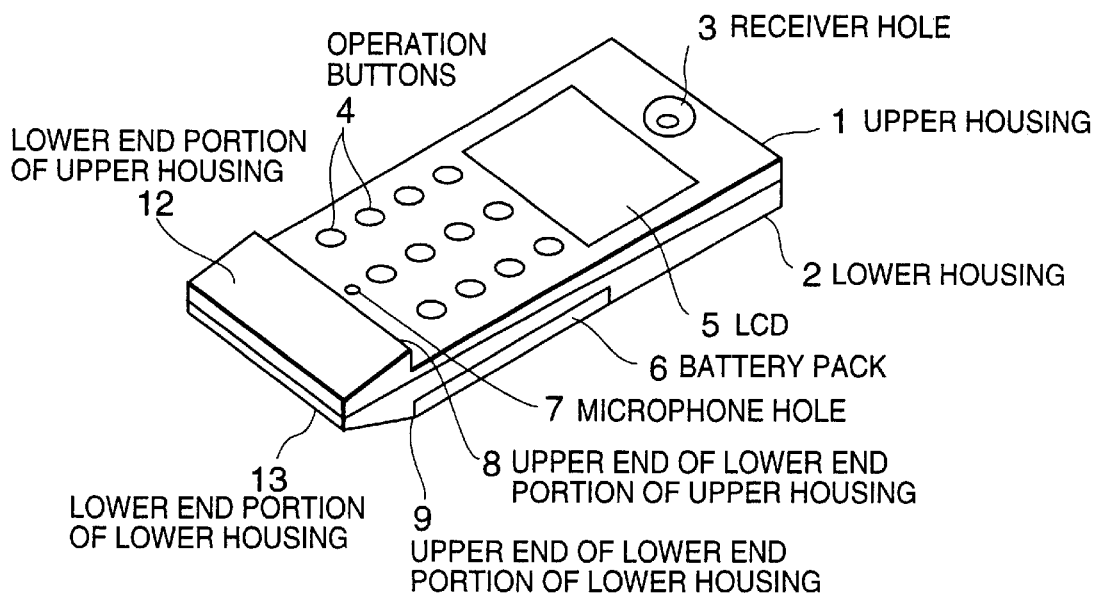
FIG. 1 is a perspective view of a portable telephone according to a first embodiment of the present invention.
Figure 2:
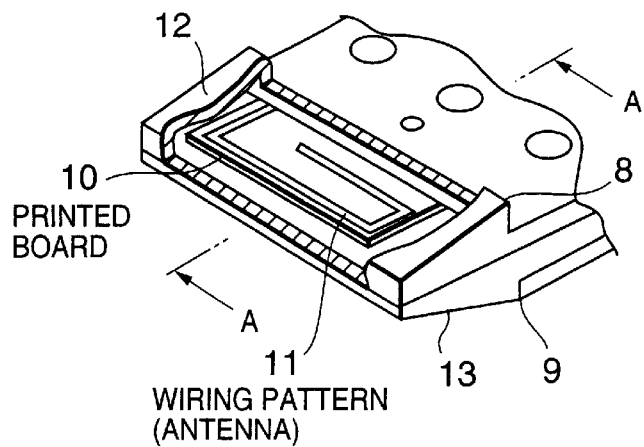
FIG. 2 is a partly broken view of the lower end portion of the portable telephone as shown in FIG. 1.
Figure 3:
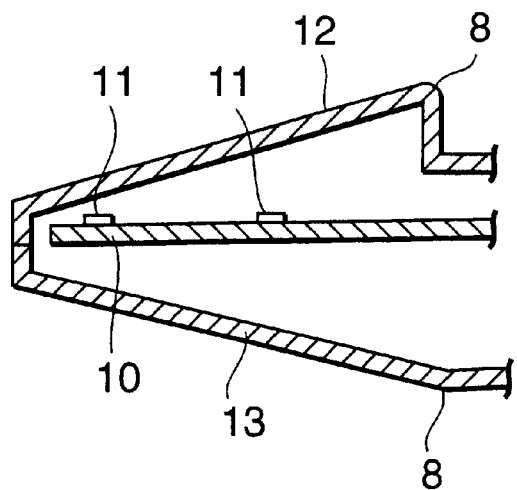
FIG. 3 is a sectional view taken along the line A—A as shown in FIG. 2.

As shown in FIGS. 1–3, a portable telephone according to a first embodiment of the present invention has the lower end portion of a housing, which is shaped, so called, to taper down in thickness. In FIGS. 1–3, the same members are denoted by the same reference numerals.

As shown in FIG. 1, the portable telephone is composed of an upper housing 1 and a lower housing 2, which are combined to an approximately rectangular parallelepiped. The major surface of the portable telephone is provided with a receiver hole 3 in which a speaker is installed to mainly convert a received voice signal in radio communication into sound waves, a set of operation buttons 4 for inputting information, an LCD (Liquid Crystal Display) 5 for displaying various information, and a microphone hole 7 in which a microphone is provided to convert user voice to a transmitting voice signal. A battery pack 6 is inserted into a bay formed in the lower housing 2 to supply power to the LCD 5 and other electronic circuits (not shown) which is provided inside the portable telephone.

In this arrangement, the upper housing 1 has a lower end portion 12 protruding from the major surface thereof at a predetermined position which is an upper end 8 of the lower end portion 12. As shown in FIG. 3, in the first embodiment, the upper end 8 protrudes at an arbitrary angle with respect to the major surface of the upper housing 1 and gradually tapers down towards the lower end of the upper housing 1. While, the lower housing 2 is shaped to gradually taper down frump a predetermined position which is an upper end 9 of the lower end portion 13 towards the lower end of the lower housing 2.

As shown in FIG. 2, a linear antenna for wireless transmission and reception of radio waves is composed of a pattern of wiring conductor 11 on a printed board 10. The setting and layout of this pattern is determined depending on various conditions such as the frequency band to be used on radio communication. A coil antenna made by winding metallic wire may be employed in some property of wireless communication. In all cases, the antenna is incorporated between the lower end portion 12 of the upper housing 1 and the lower end portion 13 of the lower housing 2.

Figure 4:
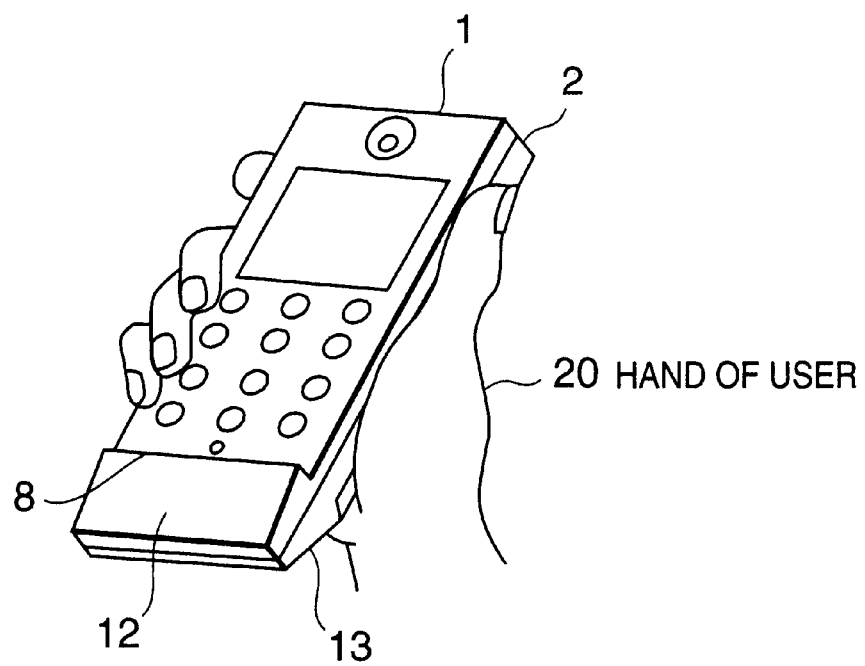
FIG. 4 is a perspective view showing a state that a user holds the portable telephone according to the first embodiment.
Figure 5:
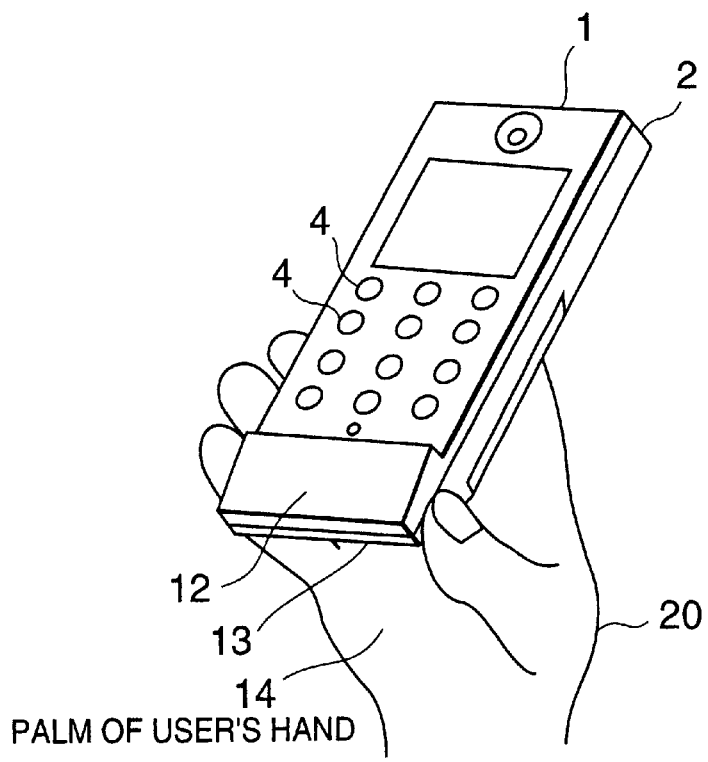
FIG. 5 is a perspective view showing another state that a user holds the portable telephone according to the first embodiment.

Next, the usage pattern of the above-described portable telephone will be described with reference to FIGS. 4 and 5. In FIGS. 4 and 5, the same members as those in FIGS. 1 to 3 are denoted by the same reference numerals.

When the portable telephone according to the first embodiment is held normally by a user's hand, the user has great difficulty in holding the lower end portion 12 and 13 of the portable telephone by a hand, because the lower end portion 12 of the upper housing 1 protrudes and the lower end portions 12 and 13 of the upper housing 1 and the lower housing 2 taper down towards the lower end of the portable telephone.

Accordingly, a user subconsciously avoids holding the lower end portions 12 and 13 and learns to hold around the center of portable telephone by a hand 20. At this time, since the lower end portion 12 of the upper housing 1 and the lower end portion 13 of tile lower housing 2 are not covered with the user's hand 20, there is provided a state having no obstruction in radio communication. Though the case held by a right hand is described in FIG. 4, the case by a left hand is also similar to that of a right hand.

As shown in FIG. 5, even if a user tries to hold the lower end by a hand with difficulty, it is substantially impossible for the user to completely hold around the lower end portion 12 of the upper housing 1 by his/her fingers because of the above-described protrusion of the lower end portion 12 causing the front side for the user to be thick. In such a holding manner, a palm 14 is subconsciously away from the lower housing 2.

In a holding manner of the portable telephone as shown in FIG. 5, the lower end portions 12 and 13 of the portable telephone including the antenna are away from the obstruction in radio communication, and the considerably advantageous state in the property of radio communication can be achieved.

Supplementing, a human body has a property of absorbing radio waves, and the above-described obstruction denotes the hand 20 of the user itself. In the present portable telephone, the antenna for transmitting and receiving radio waves on radio communication is mounted between the lower end portion 12 and the lower end portion 13. Accordingly, in the usage of portable telephone, the antenna is disposed at the most distant position from the human body, especially the head of the user.

In the present portable telephone, the influence on radio waves affected by the human body of the user is significantly reduced, comparing with the conventional portable telephone having an antenna installed at the upper end portion.

Figure 9:
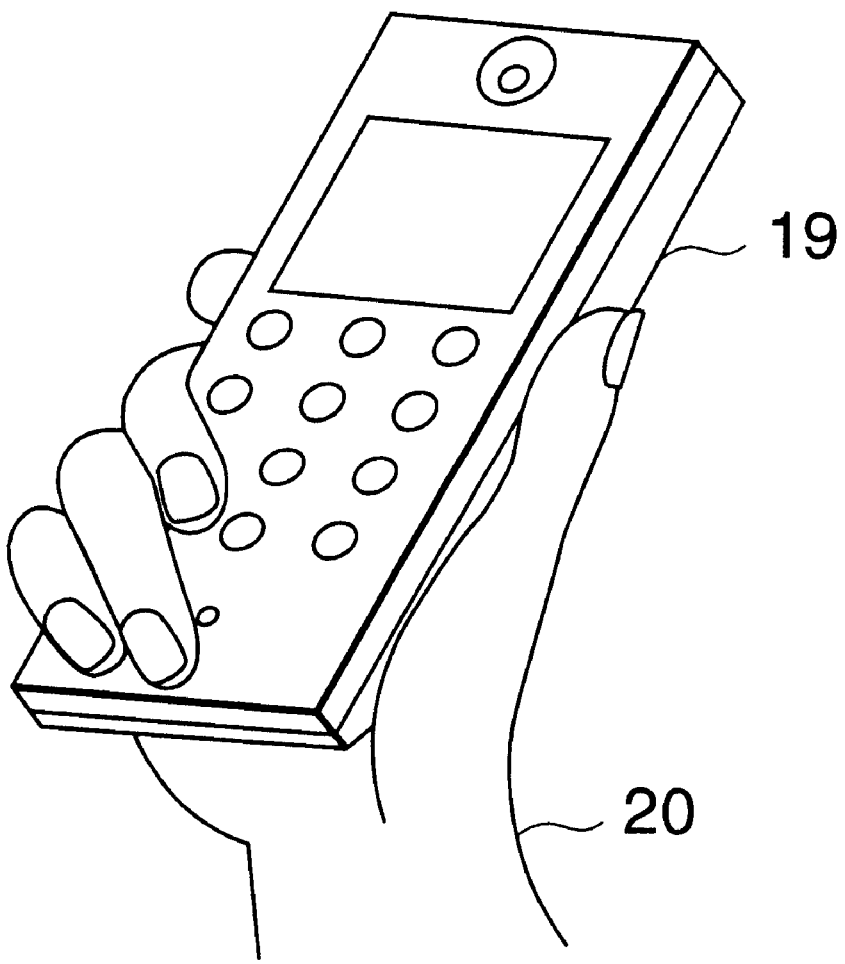
FIG. 9 is a perspective view showing a state that a user holds a conventional portable telephone simply mounted with an antenna at the lower position thereof.

If an antenna is simply disposed at the lower end of portable telephone without employing the housing of the present portable telephone, as shown in FIG. 9, most of lower end of the portable telephone is covered with the hand 20 of the user, and a substantial degradation in the property of radio communication is induced.

Figure 6:
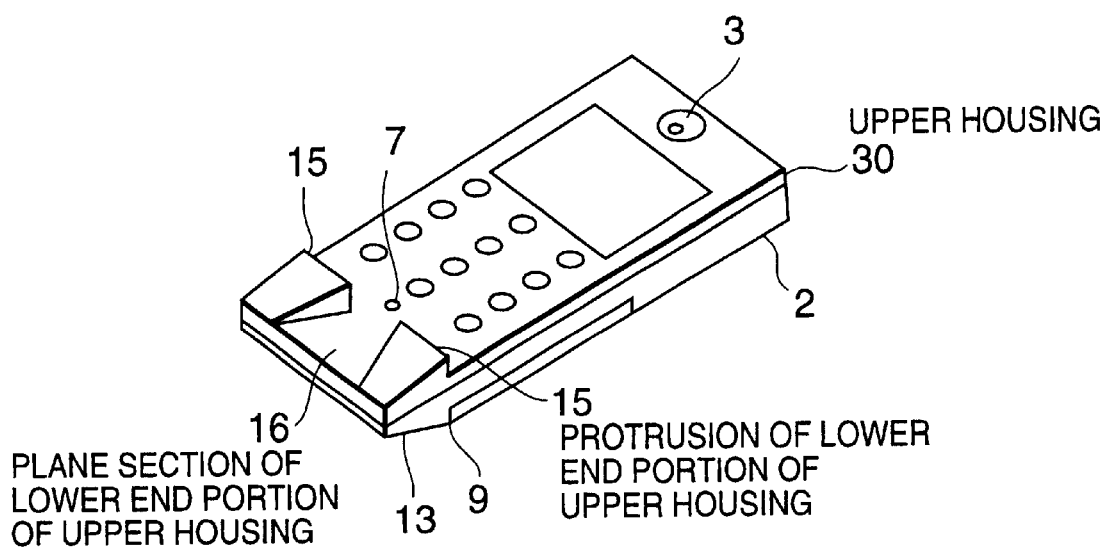
FIG. 6 is a perspective view of a portable telephone according to a second embodiment of the present invention.

A second embodiment of the present invention will be described with reference to FIG. 6. In FIG. 6, the same members as those in FIG. 1 are denoted by the same reference numerals.

Referring to FIG. 6, in a lower end portion of an upper housing 30 of the portable telephone according to the second embodiment, two protrusions 15 arc provided at both sides of the lower end portion. The lower housing 2 is shaped to gradually taper down from the upper end 9 of the lower end portion 13 towards the lower end thereof, as the case of the first embodiment.

In other words, the lower end portion of the upper housing 30 is shaped by cutting away a center portion of the lower end portion 12 of the first embodiment to form a plane section 16 as shown in FIG. 6. Similarly to the portable telephone as shown in FIG. 1, the lower end portion of the portable telephone according to the second embodiment is shaped to taper down in thickness, and an antenna is incorporated between the plane section 16 (center portion of the lower end portion) of the upper housing 30 and the lower end portion 13 of the lower housing 2.

In the arrangement of the portable telephone according to the second embodiment, the similar advantage to that in above-described first embodiment can be expected. Further, since the portable telephone according to the second embodiment is provided with the plane section 16 at the center of the lower end of the upper housing 30, an acoustic problem can be effectively avoided, such as howling caused by circulation of voice emitted from the receiver hole 3 to the microphone hole 7.

A third embodiment of the present invention will be described with reference to FIG. 7.

Figure 7:
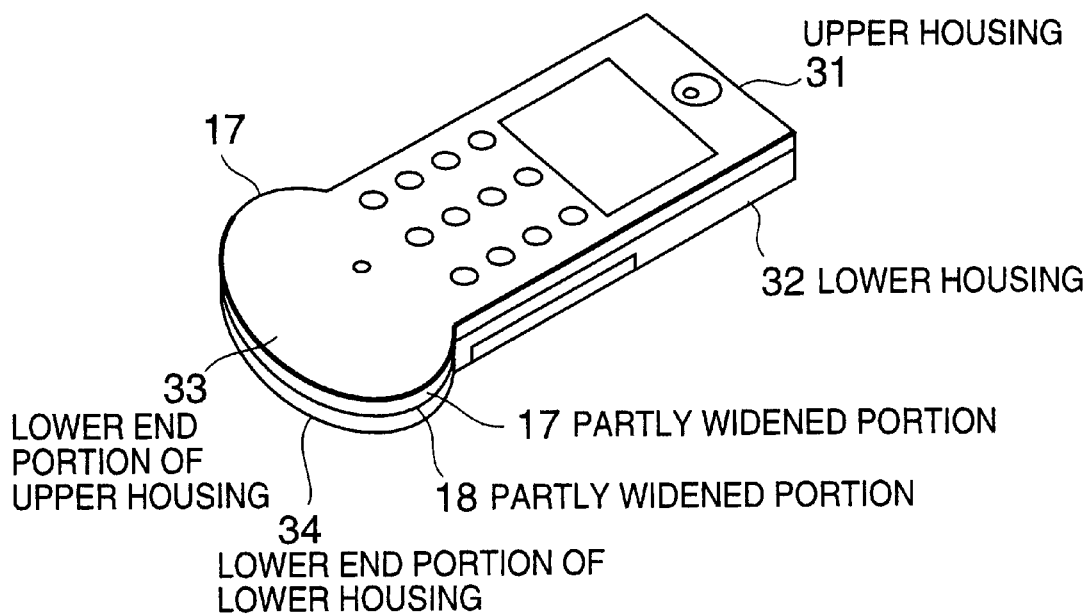
FIG. 7 is a perspective view of a portable telephone according to a third embodiment of the present invention.
Figure 8:
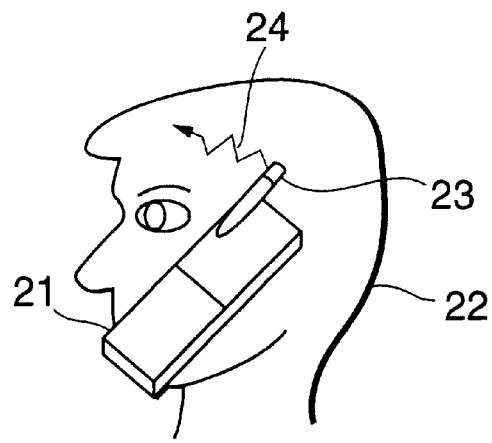
FIG. 8 is a diagram showing a state that a user uses a conventional portable telephone.

Referring to FIG. 7, a lower end portion 33 of an upper housing 31 is shaped like a partly widened and round plate 17, which is formed such that the lower end portion 33 is wider than other portions of the upper housing 31. The lower end portion 33 is shaped like a circular or elliptical plate or has a round shape as a whole. The lower end portion 33 may be shaped like a semicircular, semi-elliptical, triangular or rectangular plate.

A lower end portion 34 of the lower housing 32 is also shaped like a partly widened and round plate 18 so as to match the lower end portion 33 of the upper housing 31. Similarly to the lower end portion 33, the lower end portion 34 is shaped like a circular or elliptical plate or has a round shape as a whole. The lower end portion 34 may be shaped like a semicircular, semi-elliptical, triangular or rectangular plate. An antenna is incorporated between the lower end portions 33 and 34.

In the arrangement of the portable telephone according to the third embodiment, the similar advantage to that in above-described first embodiment can be expected. Even if a user tries to hold the lower end by a hand with difficulty, it is substantially impossible for the user to completely hold around the lower end portion 33 of the upper housing 31 by his/her fingers. Accordingly, in the present portable telephone, the influence on radio waves affected by the human body of the user is significantly reduced. Simultaneously, the degradation in the property of antenna, which is influenced by the head of user, can be significantly reduced.

The present invention has advantages such that degradation of property in radio communication, which is influenced by human body, particularly its head and hand holding the portable radio device, can be reduced. The reason is that the antenna is located away from the head of a user because the antenna is incorporated in the lower portion of the portable radio device. Simultaneously, since the lower end portion of the portable radio device is shaped to locally protrude and then taper down in thickness or to widen in width towards the lower end and the antenna is mounted in the lower end portion, the hand of a user cannot hold completely the lower portion including the antenna.

What is claimed is:

1. A portable radio device allowing radio communication through an antenna, comprising:

an upper housing having a major surface of the portable radio device and a first lower end portion shaped to protrude from the major surface and taper down towards a lower end of the portable radio device; and a lower housing having a back surface of the portable radio device and a second lower end portion shaped to taper down towards the lower end of the portable radio device, wherein the antenna is provided within the first and second lower end portions.

2. The portable radio device according to claim 1, wherein a speaker and a microphone used for telephone conversation are provided on the major surface, wherein the microphone is provided on the major surface at a position higher than the first lower end portion.

3. The portable radio device according to claim 2, wherein a center portion of the first lower end portion corresponding to the microphone is cut away to form a plane portion.

4. The portable radio device according to claim 3, wherein the plane portion is flush with the major surface provided with the microphone.

\* \* \* \* \*